July 14, 1931. J. F. MAIZNER 1,814,717
DENTURE
Filed Nov. 15, 1928
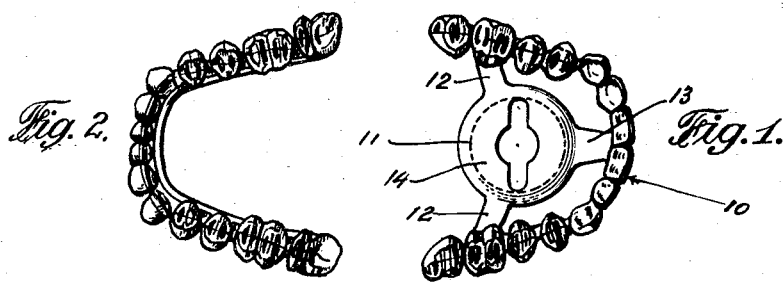
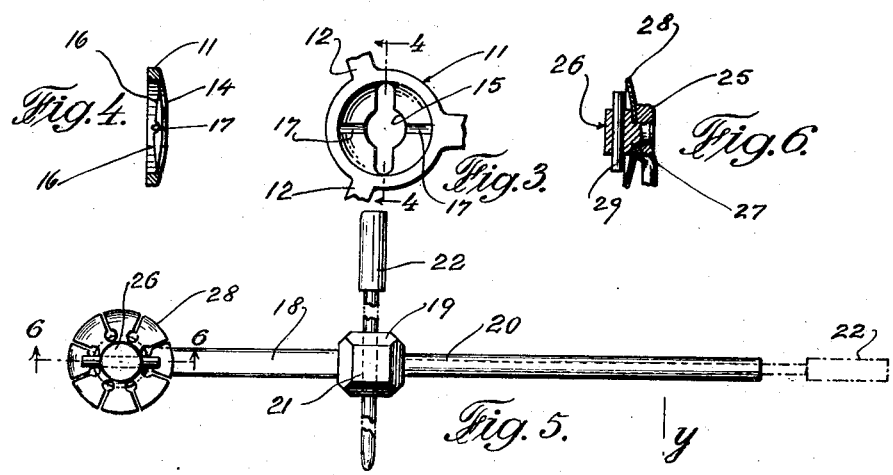
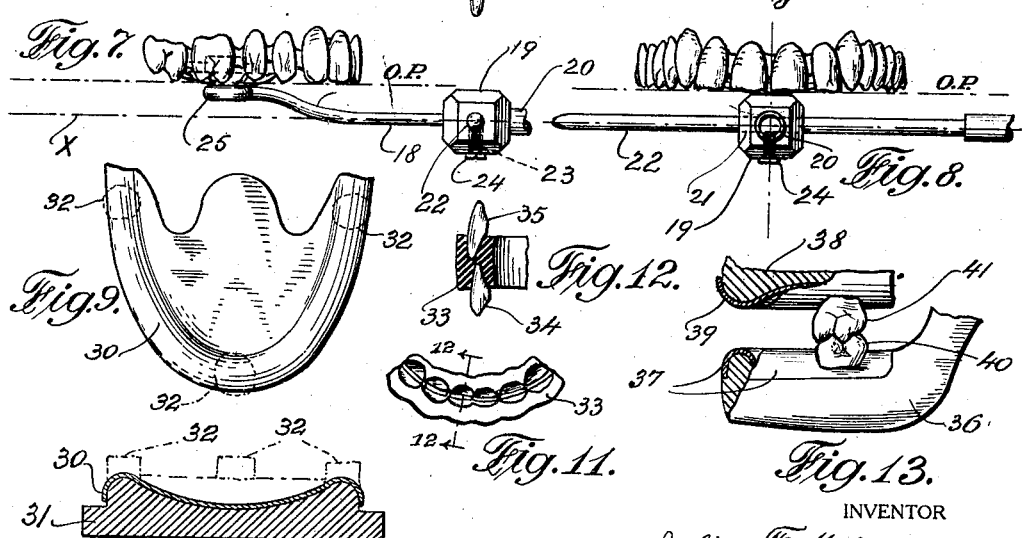
INVENTOR
Julius F. Maizner
BY
ATTORNEY Patented July 14, 1931

1,814,717

UNITED STATES PATENT OFFICE

JULIUS F. MAIZNER, OF WHITE PLAINS, NEW YORK

DENTURE

Application filed November 15, 1928. Serial No. 319,503.

This invention relates broadly to artificial dentures.

One of the prime objects of my invention is the method or process of constructing, or preparing for construction, artificial dentures by the means of employment of ready-made articulated teeth set-ups.

Another object of my invention is the method or process of producing artificial dentures through the employment of ready-made articulated teeth set-ups, so arranged as to facilitate the proper leveling of the future artificial set of teeth to the correct occlusal plane.

Another object of my invention is to provide means in the form of ready-made articulated teeth set-ups for the employment of my method.

Another object of my invention is a device attachable and detachable from the upper half of such ready-made teeth set-up for facilitating setting this set-up to the correct level of the occlusal plane.

Another object of my invention is to provide semi-pliable matrices or indexes for setting the front teeth of artificial dentures.

The foregoing and further objects will be more readily understood from the accompanying description and the drawings, forming part of this disclosure, but by no means intended to limit my basic ideas to the structure shown, as these drawings serve for explanatory purposes only.

Before proceeding to describe my invention in detail, I consider it essential to explain broadly my method, and thus establish a comparison between my invention and present day methods employed in producing artificial dentures.

It is an established fact that in order to produce properly fitting artificial dentures, in which what is known the "bite" and articulation, is correct, exceptional care has to be taken in coordinating the artificial set of teeth to the individual characteristics of the patient. Such work entails careful consideration and extensive labor, and up to the present time no means has been found whereby such labor may be abridged without seriously and detrimentally affecting the finished product. Only a few of the privileged can afford employing high-priced experts who diligently accomplish the desired task, and even then, material corrections often become necessary before the patient will feel comfortable in wearing the artificial set of teeth, and before a correct articulation is accomplished.

My method is primarily designed to produce a perfect set of teeth without the amount of time and labor ordinarily necessary, and to enable the great majority of patients to avail themselves of the services of less skilled practitioners who may safely be entrusted to produce a well-fitting, properly leveled and thoroughly articulated set of teeth for any one within a comparatively short time.

My method may be readily compared with the attempt of large industries to standardize their product, thereby decreasing its cost, which distinctly reflects upon its sales price to the consumer.

The foregoing and further objects will be more clearly understood from the explanation of my drawings, in which Figure 1 represents a plan view of the upper half of a ready-made articulated teeth set-up, Figure 2 is a plan view of a lower half of an articulated teeth set-up, Figure 3 illustrates the internal portion of the upper set-up, Figure 4 is a cross sectional view, taken on line 4—4 of Figure 3, Figure 5 illustrates a plan view of my device for defining the correct leveling of the occlusal plane, Figure 6 is a cross sectional view, taken on line 6—6 of Figure 5, Figure 7 illustrates a side elevation of the upper half of the teeth set-up connected with the device shown in Figure 5, Figure 8 illustrates the front elevation of the upper half of the teeth set-up connected with my device, shown in Figure 5, Figure 9 illustrates a top view of a trial plate, Figure 10 illustrates a cross sectional view through a trial plate and a cast of a jaw, Figure 11 illustrates the bottom view of a matrix or index for facilitating of setting of artificial front teeth, Figure 12 is a cross sectional view, taken on line 12—12 of Figure 11, showing lower and upper teeth inserted in the matrix, and Figure 13 illustrates a partial detail view of an articulator.

Referring to the figures, numeral 10 denotes the upper half of an articulated set-up provided with imitations of molars, bicuspids, eye and front teeth, representing a complete imitation of the teeth in the upper jaw. Those teeth are united and between their horseshoe-shape, there will be seen a socket member, indicated at 11, held by means of stays 12 and 13 to the teeth set. The bottom view of attaching member 11 is shown in Figure 3, and a cross section thereof is illustrated in Figure 4.

From these figures it will be seen that the attaching member comprises a shallow socket, the bottom 14 of which is provided with a peculiarly shaped perforation 15. The inner face of the remaining portion of the bottom of the socket is provided with beveled faces 16 meeting and connected by troughs or recesses 17, the purpose of which will be explained presently.

In Figure 2 there is seen the lower half of the articulated set-up, which again represents a complete set of teeth, including molars, bicuspids, lower eye teeth and front teeth.

In Figures 5 and 6 there will be seen my device for leveling the upper half of the set-up. This device consists of an horizontal member 18, attached to a center member 19, to which is attached a tubular member 20, forming an extension of member 18. Member 19 is provided with a transverse aperture 21, through which passes a cross member 22 which may be inserted, when not in use, into the tubular member 20, as shown in broken lines in Figure 5.

At the bottom of member 19 there is provided an aperture 23, in which is lodged an expansion spring held in place by means of screw 24. This spring is designed to exert a pressure against cross member 22 when inserted through member 19, so as to prevent it from disengaging the latter. The head 25 of member 18 is somewhat broadened, and attached thereto is a cylindrical extension 26, which is offset at 27 so as to permit the engagement, between head 25 and cylindrical member 26, of a dished spring member 28, divided into a plurality of individual blades, as clearly seen in Figure 5.

Through the cylindrical member there passes transversely, and in the center line of member 18, a pin 29 which is adapted to pass through aperture 15 of receiving member 11. When the device shown in Figure 5 is turned ninety degrees, pin 29 will engage or register with troughs or recesses 17 in the receiving member 11. Spring 28 will bear against the outer surface of bottom 14 and thereby exert a constant pressure, so that pin 29 is firmly held within the recesses 17, thereby the entire upper half of the set-up is connected firmly with the leveling device, which extends outwards from the set-up symmetrically and in the direction of the vertical center plane of the set-up. This arrangement is clearly seen in Figures 7 and 8.

In these figures there will be observed an upper broken line marked O. P., denoting the occlusion plane of the upper teeth set-up. The parallel broken line marked X denotes a plane parallel to the occlusal plane. The vertical center line, shown in Figure 8 and marked Y, denotes the vertical center plane of the set-up. The correct occlusal plane of the set-up must be parallel to two imaginary lines. One connecting the lower end of the ear with the lower end of the nose; the other line connecting the center of the eyes. The leveling device in Figure 5 is adapted to facilitate setting or truing up of the set-up to the correct occlusal plane.

Referring to Figures 9 and 10, there will be seen a trial plate indicated at 30, which is preferably made of shellac, and is employed in the setting and adjustment of the ready-made set-ups, as will be explained presently. Numeral 31 denotes a cast representing a copy of the jaw of the patient. There are shown in broken lines three bosses 32, representing pieces of pliable material, as for instance, beeswax.

Figures 11 and 12 illustrate a matrix or index 33, which represents a female cast in semi-pliable material of the upper and lower front teeth of both halves of the ready-made articulated set-up, and adapted to facilitate the setting of artificial teeth when copying the set-up in the articulator.

Numeral 34 represents one of the lower front teeth while numeral 35 represents one of the upper front teeth.

In Figure 13 numeral 36 denotes the lower jaw of the articulator, upon which is mounted, what may be termed, a base plate 37 made of pliable material, as for instance, beeswax. This base plate takes the place of the trial plate used in the patient's mouth, and it serves also for mounting the artificial teeth, tooth by tooth, when the dentist has satisfied himself that the set-up fits the patient correctly. Numeral 38 represents part of the upper jaw of the articulator provided with an upper base plate 39, serving for the same purpose as lower base plate 37. To each of the base plates there will be seen attached molars 40 and 41.

Operation

In order to properly execute my method of preparing and constructing sets of artificial teeth, it is necessary that the dentist is supplied with a complete set of ready-made articulated set-ups, from which he may choose one set-up for a particular patient. The first step is to make casts of the patient's jaw and prepare trial plates, made preferably of shellac or similar material. These trial plates are adapted to be inserted into the patient's mouth, over the patient's jaw, and form resting plates for the articulated set-ups. First the upper half of the set-up is tried.

Before inserting the upper trial plate, three blocks of beeswax, as shown in Figure 9, are attached to the ridge of the trial plate and then the latter is inserted into the mouth of the patient. Now the upper half of the set-up is placed in position over the trial plate and pressed upwards so that a seat is formed in the three point beeswax suspension upon the trial plate. Now the set-up and the trial plate are removed and the leveling device, shown in Figure 5, attached, whereupon, this entire combination is reset in the patient's mouth. Now the dentist decides the correct level of the occlusal plate, and when this is done, the leveling device is removed.

Now the lower trial plate is inserted in the mouth of the patient, also provided with three points of beeswax similar to that shown in Figure 9. The upper set-up, together with the trial plate, is removed from the patient's mouth. Being satisfied that the upper set-up sits correctly upon the trial plate, these two members are now permanently fastened together by means of hard wax flown around the set-up and the upper trial plate.

Now the lower set-up is temporarily attached at three points to the upper set-up in its articulated registry. Thus, the two set-ups are now inserted together with the permanently attached upper trial plate into the patient's mouth, and the patient is required to press down upon the lower trial plate so that the proper setting of the lower half of the set-up is established.

The dentist now separates the two set-ups, formerly held together temporarily, and he removes both set-ups from the patient's mouth together with the trial plates. Now the lower trial plate is firmly associated with the lower half of the set-up by flowing hard wax around the latter.

This operation finishes the preparatory work for the technique of making the denture and executed in an articulator.

By the above method it was possible to determine the correct occlusal plane of the set-up and the correct registry or bite and articulation of both upper and lower teeth.

Now both halves of the set-up are again temporarily united with each other in their articulated relation to each other and the casts of the upper and lower jaws, corresponding to the jaws of the patient, are mounted in the articulator. Now the set-up with its trial plates is placed upon the articulator and the casts are adjusted to correspond exactly to the setting of the patient's jaws. When thus correctly set, they are fixed within the articulator, so as to preclude any movement. Now the upper set-up is removed together with the trial plate, and instead of the trial plate a base plate of wax is substituted.

Now the laboratory technique takes place in that the artificial teeth are set and adjusted to the lower teeth set-up and then fastened to the base plate of the upper jaw. Starting with the molars, the work proceeds towards the front teeth. In their correct position all the teeth are held by wax upon the base plate. When setting the front teeth the matrix, shown clearly in Figures 11 and 12, is placed upon the front teeth of the set-up of the lower half and the artificial front teeth are now placed in the matrix, which automatically holds them in an exact position as if they would be part of the upper half of the set-up. Thus held by the matrix they are readily attached to the wax base plate.

Once the upper set of teeth is correctly set and attached to the wax base plate, the lower half of the set-up is removed from the articulator and the lower trial plate is replaced by a lower base plate made of wax and the process of setting the teeth in the lower jaw to the articulated position of the upper teeth is now proceeded with.

Starting again from the molars, the dentist proceeds towards the front teeth and then again the matrix is employed, being slipped over the upper teeth and serving as guide for setting the lower teeth. In this manner a complete and correct set of artificial teeth is produced on the wax base plate, which now serves as the pattern from which a reproduction is made either in hard rubber or other material, in which the artificial teeth are united in the same manner as they appear on the wax base plate. This latter part of laboratory technique is well known and needs no further explanation.

From the foregoing it will be clearly evident that my invention, so to speak, standardizes the production of artificial teeth sets, in that it enables the dentist to select for a patient, out of his set of set-ups, the most suitable set-up with which he can proceed in the patient's mouth without difficulty to prepare an articulated model for the future artificial teeth of the patient which he then finishes in the articulator to such a perfection that a trial or corrections will be practically eliminated. In other words, he is in position to deliver to the patient a perfect set of teeth correctly sitting and articulated to such perfection as only is possible today by the employment of considerable time and a great deal of labor.

While I have shown and described specific forms of my device, be it understood that I shall not be restricted to the actual showing and description thereof. I am not aware of any attempt ever made heretofore to standardize the construction of artificial dentures by the employment of ready-made sets of set-ups, and I therefore shall not be restricted by, and I reserve for myself the right to make such changes and improvements of my device, shown in the drawings, as may be required due to various arising conditions, without departing from my broad and basic idea, for which I claim:

1. The process of producing dentures, which comprises, selecting a ready-made articulated teeth set-up corresponding in size and shape to the jaws of a patient, placing a trial plate over the upper jaw of the patient, supplying a pliable substance to the seating face of the plate, inserting and temporarily seating the upper half of the set-up upon said trial plate, adjusting said upper half so that its occlusal plane is parallel to two imaginary lines, one drawn from the ear to the nose and the other connecting the eyes of the patient, firmly securing the upper set-up half with the trial plate, placing a trial plate over the lower jaw of the patient, supplying a pliable substance to the setting face of the lower trial plate, temporarily joining the lower half of the set-up with the upper half thereof and permitting the patient to press the lower half set-up against the lower trial plate so as to establish proper seating thereon, separating the set-up halves, firmly securing the lower half of the set-up to the lower trial plate, removing the set-up halves, now joined with their respective trial plates, from the patient's mouth, joining the set-ups temporarily in their articulated setting, inserting into the trial plates, casts of the patient's jaws, mounting the casts in an articulator, removing the upper set-up half and substituting for the upper trial plate a pliable base plate, fastening to the base plate artificial teeth so as to register with the teeth of the lower set-up, permanently fixing the artificial teeth of the upper jaw in their setting, removing the lower half of the set-up replacing the lower trial plate by a pliable base plate, setting artificial teeth upon said base plate to register with the artificial teeth of the upper jaw, fixing the now set teeth to the trial plate and finishing the dentures for the use of the patient.

2. The combination with a ready-made articulated teeth set-up having an upper teeth set, of a device attachable to and detachable from the latter for facilitating leveling of the upper teeth set to the correct occlusal plane, said device comprising a bar adapted to extend partially into the patient's mouth, spring controlled attaching means provided at one end of said bar, another bar detachably associated with the first mentioned bar and disposed at right angles to the latter.

3. A device for defining the correct level of the occlusal plane of dentures, comprising a longitudinal member adapted to be temporarily attached to and extend symmetrically from a trial teeth set up, and a cross bar associated with said member at rectangular relation to the latter, said longitudinal member having spring controlled attaching means adapted to engage the upper half of a teeth set-up.

4. The combination with a ready-made articulated upper teeth set-up, of a device for defining the correct level of occlusal plane for said set up, comprising a connecting member, adapted to engage said set up, a longitudinal member extending therefrom, a cross member associated with and disposed at rectangular relation to said former member and adapted to be removable therefrom, said connecting member comprising an attaching pin and a resilient holding member, both of which adapted to co-act with each other and the upper half of the teeth set-up for holding said connecting member in place, the latter provided with a socket for accommodating said cross member when the device is not in use.

5. The combination with a ready-made articulated teeth set-up, for producing artificial dentures, composed of an upper and a lower half, said upper half having instrument attaching means, of an instrument for determining the correct occlusal plane of the set-up comprising a member having means for associating it with the attaching means of said upper half of the teeth set-up, said member adapted to define one direction of the occlusal plane of the set-up, another member associated with the first member and adapted for use in defining the other direction of the occlusal plane.

In testimony whereof I affix my signature.

JULIUS F. MAIZNER.